United States Patent [19]
Uchida

[11] 3,742,290
[45] June 26, 1973

[54] SAMPLING SYSTEM

[76] Inventor: Kozu Uchida, c/o Iwatsu Electric Co., LTD., 7-41, Kugayama 1-chome, Suginami-ku, Tokyo, Japan

[22] Filed: Feb. 11, 1971

[21] Appl. No.: 114,435

Related U.S. Application Data

[63] Continuation-in-part of Ser. No. 781,179, Dec. 4, 1968, abandoned.

[52] U.S. Cl. .................................................. 315/25
[51] Int. Cl. ............................................ H01j 29/70
[58] Field of Search ................................ 315/26, 25

[56] References Cited

UNITED STATES PATENTS 3,466,553 9/1969 Struckert ............................ 315/25
3,423,629 1/1969 Best et al. ............................ 315/25
3,456,189 7/1969 Hornak ................................ 315/25

*Primary Examiner*—Carl D. Quarforth
*Assistant Examiner*—J. M. Potenza
*Attorney*—Robert E. Burns

[57] ABSTRACT

A pulse generator included in a sampling system generates sampling pulses, whereby a waveform similar to the input signal waveform is obtained at the output terminal of the sampling system. Synchronization of a sampling apparatus such as a oscilloscope with a measuring signal without using additional synchronized signals can be assured.

14 Claims, 12 Drawing Figures

OUTPUT AT PULSE GENERATOR 4

OUTPUT AT LOW SPEED SWEEP CIRCUIT 7

OUTPUT AT LOW SPEED SWEEP CIRCUIT 7 FOR COMMUTATING CIRCUIT 11

OUTPUT AT COMMUTATING CIRCUIT 11 FOR COMMUTATING SWITCH 6

OUTPUT AT COMMUTATING CIRCUIT 11 FOR VARIABLE FREQUENCY PULSE GENERATOR 12

SAMPLING SYSTEM

Figure 1:
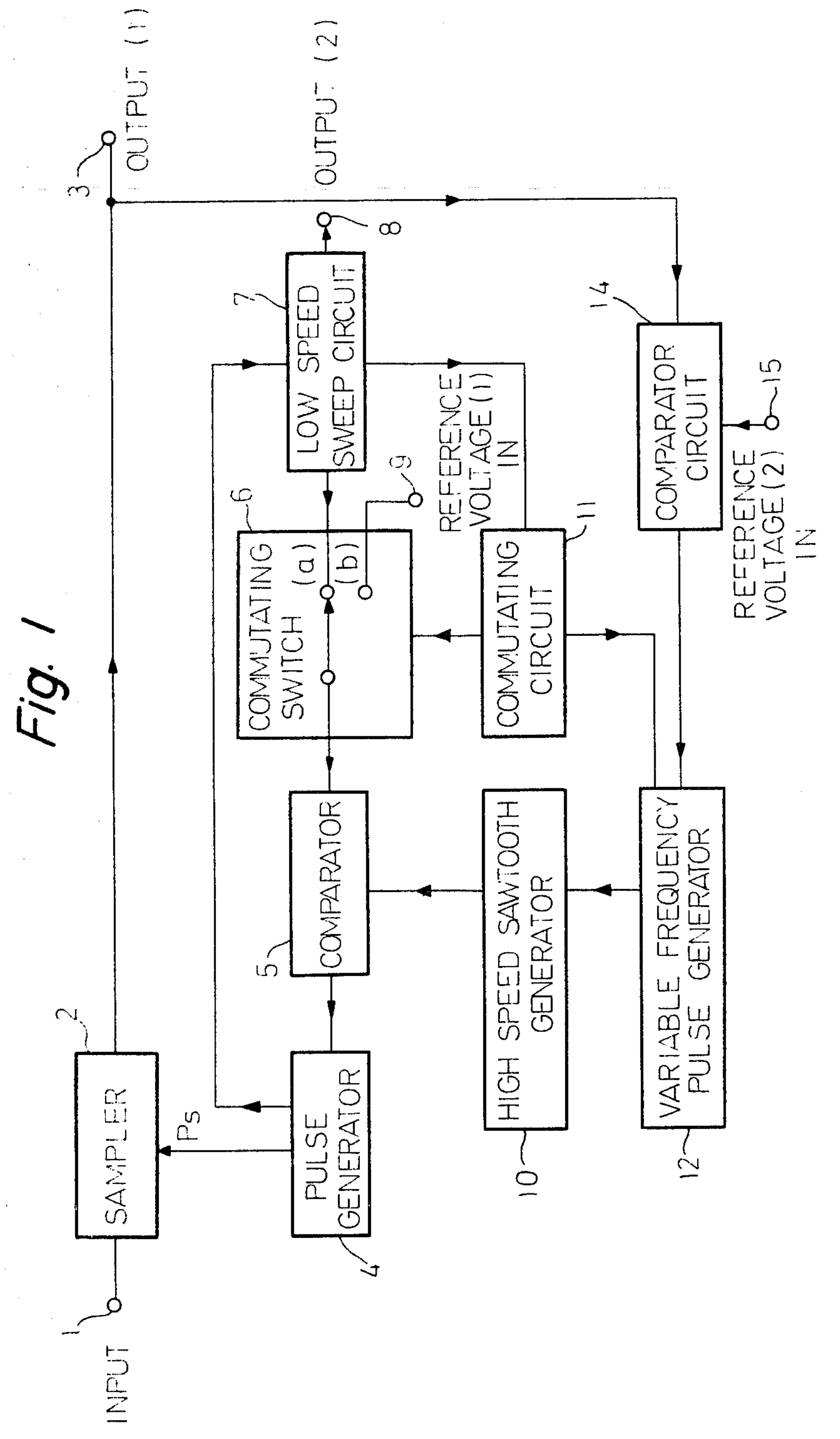

This is a continuation-in-part of Ser. No. 781,179 filed on Dec. 4, 1968, now abandoned.

The present invention relates to an improved sampling system usable in combination with a sampling oscilloscope or other sampling apparatus.

As is well-known, the conventional sampling systems used for a sampling oscilloscope etc. utilize a part of a measuring signal or a signal synchronized with the measuring signal in order to acquire a synchronization of the sampling oscilloscope. However, use of such an additional synchronized signal results in operational problems of the system and, in the case of some types of supply sources of the measuring signal, it is considerably difficult to obtain such synchronized signals.

A principal object of the present invention is to provide an improved sampling system which can assure synchronization of a sampling oscilloscope etc. with a measuring signal, without using an additional synchronized signal, while eliminating the aforementioned drawbacks possessed by the conventional sampling systems.

Another object of the present invention is to provide an improved sampling system eliminating operational difficulties possessed by the sampling system requiring an additional synchronized signal.

In order to attain the aforementioned objects of the invention, the sampling system of the present invention comprises sampling means including a sampler, a variable frequency pulse generator means including a variable frequency pulse generator, a high speed sawtooth generator, a low speed sweep circuit, a commutating switch, a comparator, a pulse generator and means defining synchronizing time periods and sampling time periods including a commutating circuit. The sampler samples an input signal waveform using a sampling pulse and holds respective sampled levels to the following sampling time slot. The variable frequency pulse generator generates output signals in the synchronizing time periods having varying pulse repetition frequencies in accordance with the difference in voltage between an output of a sampler and the second reference voltage. The high speed sawtooth generator generates high speed sawtooth waves being triggered by the output pulse of the variable frequency pulse generator. The low speed sweep circuit generates low speed sweep waves or staircase waves which are synchronized with the low speed sweep waves. The commutating switch commutates the output voltage of the low speed sweep circuit with the first reference voltage. The comparator generates a pulse at a moment when the level of the output of the commutating switch and level of the high speed sawtooth wave coincide. The pulse generator generates the aforementioned sampling pulse in synchronism with an output of the comparator. The commutating circuit commutates the commutating switch toward the first reference voltage while actuating the frequency varying action of the variable frequency pulse generator during the required control time. By the aforementioned combined operation of the sampling system of the present invention, a waveform similar to the input signal waveform is acquired at the output terminal of the sampler in the sample time periods.

Further features and advantages of the present invention will be apparent from the ensuing description with reference to the accompanying drawings to which, however, the scope of the invention is in no way limited.

Figures 2A, 2B, 2C, 2D, 2E:
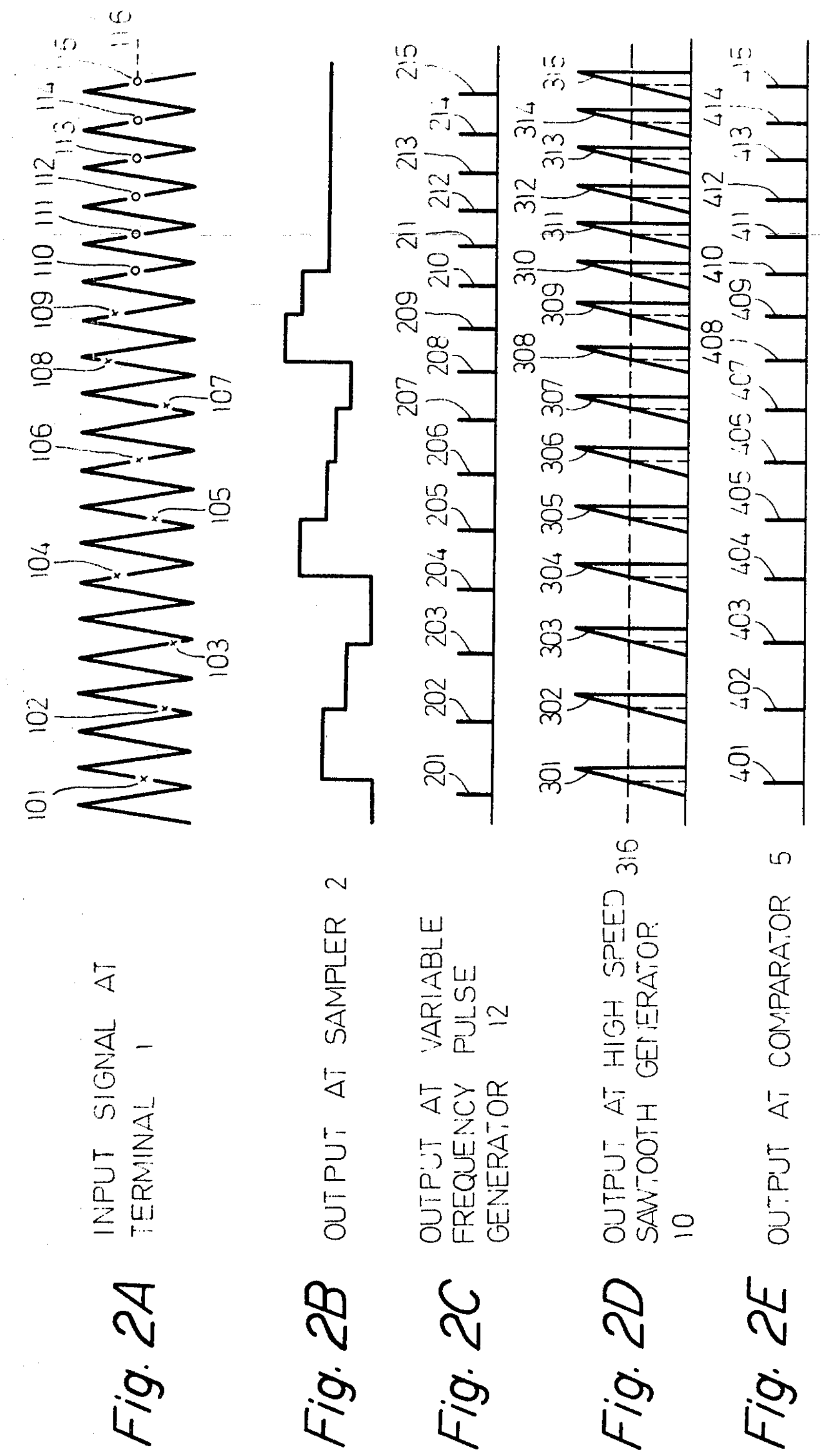
Figure 3A:
Figure 3B:
Figure 3C:
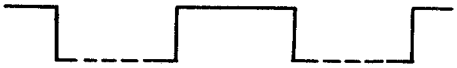
Figure 3D:
Figure 3E:
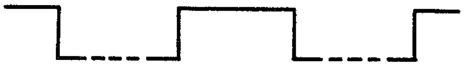
Figure 4:
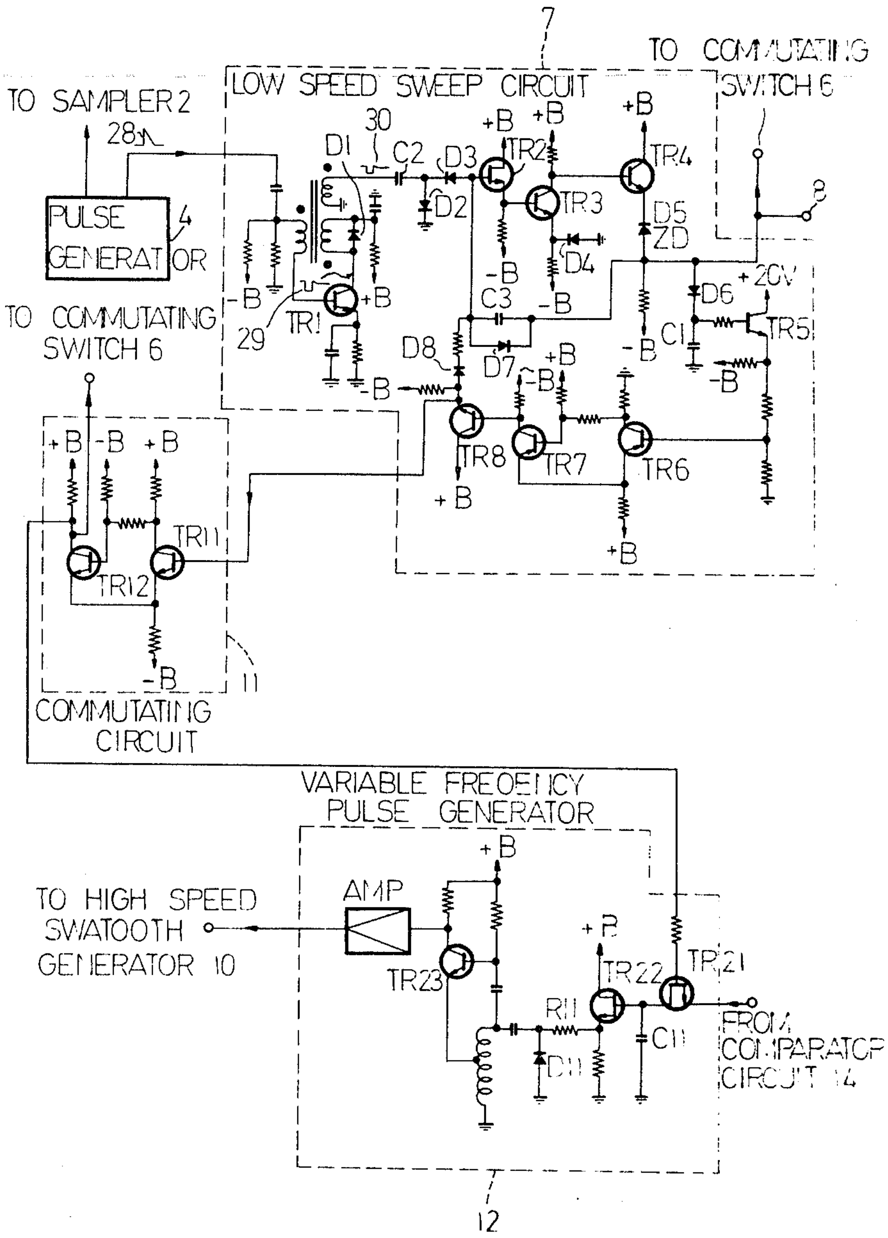

FIG. 1 is a block diagram of an embodiment of the sampling system of the present invention, FIGS. 2A to 2E are diagrams for showing waveforms obtained in respective portions of the system shown in FIG. 1, FIGS. 3A to 3E are diagrams for showing waveforms obtained in the low speed sweep circuit and the commutating circuit, and FIG. 4 is a circuit diagram for showing one example of an embodiment of the present invention.

Referring to FIG. 1, an embodiment of the sampling system of the present invention is shown. The system includes an input terminal 1, a pulse generator 4 for generating a sampling pulse $P_s$ having extremely narrow width and a sampler 2 connected to the input terminal 1 and to the pulse generator 4. The sampler 2 samples the measuring signals one by one using the sampling pulse $P_s$ from the pulse generator 4 and holds each amplitude component of the sampled signal until the subsequent sampling. The output signal of the sampler 2 is picked up at the output terminal 3. An output of the pulse generator 4 is connected also to a low speed sweep circuit 7 having outputs connected to a commutating circuit 11, connection point (a) of a commutating switch 6, and to an output terminal 8. A comparator circuit 14 is connected to an output of the sampler 2 and detects the difference between the output voltage (sampled signal) and a second reference voltage impressed on the comparator circuit 14 through an input terminal 15. A variable frequency pulse generator 12 is connected to an output terminal of the comparator circuit 14 and is coupled to an output terminal of the low speed sweep circuit 7 via the commutating circuit 11. The repetition frequency of the pulse generated by the variable frequency pulse generator 12 is variably controlled according to the output of the comparator circuit 14. The frequency controlling operation of the comparator circuit 14 is turned on and off in accordance with the output of the low speed sweep circuit 7 transmitted, thereto, by way of the commutating circuit 11. A high speed sawtooth generator 10 is connected to an output of the variable frequency pulse generator 12 and generates high speed sawtoothed waves activated by the output pulse of the variable frequency pulse generator 12. A comparator 5 is connected to an output of the high speed sawtooth generator 10 and to an output of the low speed sweep circuit 7 via the commutating switch 6. The comparator 5 compares an output of the low speed sweep circuit 7 with an output of the high speed sawtooth generator and generates a pulse only when levels of both waveforms coincide. The commutating circuit 11 is also connected to the commutating switch 6 and impresses either output of the low speed sweep circuit 7, or the first reference voltage impressed on the input terminal 9 upon the comparator 5. The output of the comparator 5 is brought into the pulse generator 4 causing generation of the sampling pulse $P_s$.

In the aforementioned embodiment of the system, the operational features of every element in the system are, as hereinafter, described. An input signal, as shown in FIG. 2A, impressed to the input terminal 1 is brought into the sampler 2, sampled therein, and picked up at the output terminal 3 in the form of a sampled signal as shown in FIG. 2B. A part of the sampled signal voltage is brought into the comparator circuit 14 and is compared with the second reference voltage also connected thereto, through the input terminal 15. Usually, this reference voltage is selected to be between the maximum and minimum values of the sampled signal voltage from the sampler 2, as shown at 116 in FIG. 2A. A difference in the voltages of the second reference voltage and the sampled signal causes generation of an output signal from the comparator circuit 14 and the output signal is impressed upon the variable frequency pulse generator 12 causing a change in the oscillating frequency of the variable frequency pulse generator 12 as shown in FIG. 2C. The output pulse of the variable frequency pulse generator 12, as shown in FIG. 2C, is brought into the high speed sawtooth generator 10 to cause the generation of a high speed sawtooth wave and the generated high speed sawtooth wave, as shown in FIG. 2D, is brought into the comparator 5. In the case where the commutating switch 6 is switched on to the terminal 9, the first reference voltage, as shown at 316 in FIG. 2D, is compared with the high speed sawtooth wave from the high speed sawtooth generator 10 within the comparator 5. When the levels of both waves coincide, the comparator 5 generates a pulse which is coupled into the pulse generator 4, and the pulse generator 4 generates a sampling pulse $P_s$. The sampling pulse $P_s$ is brought into the sampler 2 to actuate a sampling operation, thereof. A part of the output of the pulse generator 4, as shown in FIG. 3A, is brought into the low speed sweep circuit 7 to cause generation of a staircase wave and this staircase wave output, as shown in FIG. 3B, is picked up at an output terminal 8 connected to the low speed sweep circuit 7. This picked-up signal is generally used as a time base signal on a display of an oscilloscope or an X–Y recorder.

A part of the output of the low speed sweep circuit 7 is brought into the commutating switch 6, during the scanning period $T_2$ shown in FIG. 3B, while another part of the signal pulse, as shown in FIG. 3C, is brought into the commutating circuit 11 during the period between the moment that the staircase output of the low speed sweep circuit 7 has reached a certain value and the moment that sweeping operation is restarted, that is during the hold off period $T_1$ in FIG. 3B. According to this given part of the signal pulse, the commutating circuit 11 provides commutating signals, as shown in FIGS. 3D and 3E, to both the commutating switch 6 and the variable frequency pulse generator 12.

When a waveform shown in FIG. 2A is supplied to the input terminal 1 in the aforementioned construction of the sampling system of the present invention, the output of the sampler 2 shown in FIG. 2B is compared with a voltage impressed at the terminal 15 and shown with the level 116 in FIG. 2A in the comparator circuit 14. In case there is any difference between the two, the difference signal is given to the variable frequency pulse generator 12 and the above difference signal changes the repeating frequency of the pulse as is shown in FIG. 2C. This pulse shown in FIG. 2C is next given to the high speed sawtooth generator 10 and produces a high speed sawtooth wave, shown in FIG. 2D, which is coupled to the comparator 5. A voltage with a level 316 shown in FIG. 2D is impressed upon the terminal 9 and is compared with the high speed sawtooth wave shown in FIG. 2D in the comparator 5. At the moment when both of the two coincide, a pulse shown in FIG. 2E is generated at comparator 5 so as to actuate the pulse generator 4 and the sampler 2.

In the case where the aforementioned operation is repeated as shown in FIG. 2A to 2E with the commutating switch 6 being switched to (b), the sampling point moves 101, 102, 103 . . . on the signal waveform shown in FIG. 2A and, accordingly, the output of the sampler 2 becomes staircase-like as is shown in FIG. 2B. The waveform shown in FIG. 2B is compared with the voltage of level 116 impressed upon the terminal 15 in the comparator circuit 14 and the output of the comparator circuit 14 is given to the variable frequency pulse generator 12. As a result of this, the repeating frequency of the output pulse of the variable frequency pulse generator 12 changes as 201, 202, . . . 209 in FIG. 2C and, accordingly, the repetition frequency of the output pulse of the high speed sawtooth generator 10 changes as 301, 302, . . . 309 in FIG. 2D. Together with this change, the frequency of the output pulse of the comparator 5 changes also as 401, 402, . . . 409 as is shown in FIG. 2E.

However, when a pulse of 210 is generated and pulses of 310, 410 follow and the point of 110 is sampled, the output of the sampler 2 and the level 116 impressed upon the input terminal 15 coincide and no output of the comparator circuit 14 is obtained. Then the change of the frequency of the output pulse of the variable frequency pulse generator 12 stops, pulse of 211 is generated and pulses of 311, 411 are followed and the point of 111 is sampled. When the sampled point coincides with the level 116, no output of the comparator circuit 14 is obtained, the frequency of the variable frequency pulse generator 12 shows no change, the pulse 212 is generated and the aforementioned operation is repeated in a same manner. Consequently, the output of the sampler 2 becomes constant, the sampler 2 samples same points on the signal wave shown in FIG. 2A and a synchronized pulse such as shown with 210 –215 in FIG. 2C can be acquired. By changing the level 116 and 316 independently or concurrently, the position of the synchronizing point on the signal waveform shown in FIG. 2A changes accordingly.

Because the length of the time required for synchronization is extremely short, by presetting the low speed sweep circuit 7 so as to start its operation within this period, the low speed sweep wave generated by the low speed sweep circuit 7 actuates the commutating circuit 11, switches the commutating switch 6 to connecting point (a) and fixes the synchronized condition of the synchronizing pulse of the variable frequency pulse generator 12. In other words, the frequency of the synchronized pulse is stored in the variable frequency pulse generator 12. In this situation, the frequency of the pulse generated by the variable frequency pulse generator 12 gives no change even when any signal is given, thereto, by the comparator circuit 14. That is, the comparator circuit 14 is turned off in accordance with the output of the low speed sweep circuit 7 via the commutating circuit 11. This condition is maintained as far as the commutating switch 6 is switched to connecting point (a), in other words, as long as sweeping is carried out on the low speed sweep circuit 7.

As long as sweeping is carried out, the high speed sawtooth generator 10 generates a high speed sawtooth wave in response to the pulse given by the variable frequency pulse generator 12, the generated high speed sawtooth wave is given to the comparator 5, the comparator 5 generates a pulse at a point coinciding with the staircase voltage generated by the low speed sweep circuit 7 and actuates the pulse generator 4 so as to cause sampling operation. Simultaneously, a part of the output of the pulse generator 4 is brought into the low speed sweep circuit 7 so as to raise the staircase wave by one step. Thus raised the staircase wave is compared with the subsequently given high speed sawtooth wave in the comparator 5 so as to generate a pulse when both of the two coincide and this pulse forms a more delayed pulse than the foregoing pulse on the input signal waveform. The delayed pulse actuates the pulse generator 4 so as to cause sampling and the staircase waves further rises by one step. By repeating the above-mentioned operations, gradually delayed sampling pulses are formed on the input signal wave. And by carrying out sampling at little by little different positions on the signal waveform impressed on the input terminal 1, a waveform (not shown) similar to the signal waveform can be acquired at the output terminal 3 of the sampler 2.

When the raised staircase wave generated by the low speed sweep circuit 7 has reached a certain value, the low speed sweep circuit 7 is reset, the signal generated by this reset switches the commutating switch 6 to connecting point (b), the variable frequency pulse generator 12 changes the frequency of the generating pulse according to the signal given by the comparator circuit 14 so as to obtain a synchronizing pulse. By repeating the aforementioned operation, the sampling system can obtain a synchronization and a sampled signal waveform.

In the foregoing descriptions, a staircase wave was employed as a waveform to be generated from the low speed sweep circuit 7. However, a low speed sawtooth wave or a waveform having less steep slope than that of the high speed sawtooth wave (FIG. 2D) can also be employed. Further, the period for obtaining a synchronized pulse is not limited to between the reset of the low speed sweep circuit 7 and the start of the following sweep. The commutating circuit 11 can be actuated at any time required.

In case a repeating frequency $f_s$ of the measuring signal is too high, the repeating frequency $f_0$ of the synchronized pulse should be so defined that a relation $f_s = nf_0$ is satisfied between the two provided that n is an integer. This can be realized by sampling the signal waveform selectively.

FIG. 4 is a circuit diagram for showing one example of an embodiment of the present application. In the low speed sweep circuit 7, a transistor TR1 composes a blocking oscillator, a field effect transistor TR2 is provided for a source follower circuit, transistors TR3 and TR4 are provided for an amplifier and an emitter follower circuit, respectively, and a diode $D_5$ is a Zener diode. The output 28 of the pulse generator, which is the same as shown in FIG. 3A, is applied to the transistor TR1. The output waveform of the transistor TR1 is shown by the reference numbers 29 and 30. A capacitor $C_1$ is provided for determining the time period $T_1$ on FIG. 3B. Transistor TR5 is provided for an emitter follower, transistors TR6 and TR7 compose a multivibrator circuit, and a transistor TR8 is also provided for an emitter follower. When an output pulse of the pulse generator, which is shown in FIG. 3A, is applied to the low speed sweep circuit, the low speed sweep circuit generates a staircase wave having a time period $T_2$ shown in FIG. 3B, and the output of the staircase wave is obtained on an output terminal 8 and also is applied to the terminal (a) of the commutating switch 6, a capacitor $C_3$ is the accumulating capacitor which is charged in a stepwise manner during the period $T_2$ (FIG. 3B). When an output of the above-mentioned staircase wave reaches its peak value, the output is applied passing through a diode D6 and the transistor TR5 to the transistors TR6 and TR7 and triggers the multivibrator composed of TR6 and TR7, thereby the time period $T_1$ is commenced. On the other hand, its peak value is charged to the capacitor $C_1$ and next discharged by a base current of the transistor TR5. When the potential of an emitter of the transistor 5 drops below a certain predetermined value, the multivibrator composed of the transistors TR6 and TR7 is again reversed and thus, the time period $T_1$ is completed. The output of the multivibrator is obtained in an emitter of the transistor TR8 and its waveform is shown in FIG. 3C, and this is applied via diode 8 to the capacitor $C_3$ which is charged during the period $T_2$ and discharged during the period $T_1$. A diode $D_7$ is provided for maintaining a base line of the output staircase wave at an approximately zero volt level. During the period $T_1$, the diode $D_8$ goes into an on state, then cuts off the charging pulses from the pulse generator 4 so that the accumulating capacitor is not charged in the period $T_1$. The output waveform of the low speed sweep circuit, shown in FIG. 3C, is also applied via connecting means 24 to the commutating circuit 11.

In the commutating circuit 11, transistors TR11 and TR12 compose a multivibrator and the waveform shown in FIG. 3E is obtained on a collector of the transistor TR12. A waveform having an opposite polarity is obtained on a collector of the transistor TR11. The waveform shown in FIG. 3E is applied to the variable frequency pulse generator 12, and also is applied to the commutating switch 6.

In the variable frequency pulse generator 12, a field effect transistor TR21 is provided for a switching element, and a field effect transistor TR22, for a source follower. A source of the field effect transistor TR22 is applied through a resistor $R_{11}$ having a high resistance value to a variable capacitance diode $D_{11}$ and the capacitance thereof varies depending on the applied voltage. A transistor TR23 is provided for an oscillator, the oscillation frequency of which varies with the capacitance of the variable capacitance diode 11. An output of the transistor 23 is amplified by the saturation amplifier, a square wave output of the amplifier is applied to the high speed sawtooth generator 10. When the waveform shown in FIG. 3E is applied to a gate of the field effect transistor TR21, a drain of TR21 is in the on condition in the time period $T_1$ and is in the off condition in the time period $T_2$. In this case, a final instantaneous value at the time period $T_1$ applied to the terminal 28 from the comparator circuit 14 is stored in the capacitor $C_{11}$ and this stored value is maintained during the time period $T_2$. During the time period $T_1$, the action described in FIGS. 3A – 3E is carried out and the synchronized condition is stored at the final instant of the time period $T_1$ and this stored condition is maintained during the time period $T_2$.

As is mentioned above, by employing the sampling system of the present invention without requiring an external synchronizing pulse, it is possible to produce a synchronizing pulse using a sampled waveform, to store the repeating frequency of the pulse, to sample the waveform based upon the synchronizing pulse and to obtain a waveform similar to the signal waveform.

While the invention has been described in conjunction with certain embodiments thereof, it is to be understood that various changes and modifications may be made without departing from the scope and spirit of the present invention.

What I claim and desire to secure by Letters Patent is:

1. An improved sampling system comprising sampler circuit means for sampling an input signal waveform by using a sampling pulse and for holding respective sampled levels to a following sampling time slot, a first reference voltage input means, variable frequency pulse generator means for producing output pulses having a repetition frequency which varies in accordance with the difference in voltage between an output of said sampler circuit means and the first reference voltage input means for synchronizing said output pulses to an intergral multiple of the frequency of said input signal waveform a high speed sawtooth generator having said output pulses applied thereto for triggering said sawtooth generator to produce high speed sawtooth waves, a low speed sweep circuit for generating low speed sweep waves, a commutating switch, and a second reference voltage input means coupled to said commutating switch for commutating an output voltage of said low speed sweep circuit, a comparator for generating a pulse at a moment when the level of said output of said commutating switch and the level of said high speed sawtooth wave coincide, a pulse generator for generating said sampling pulse in synchronism with an output of said comparator and a commutating circuit for commutating said commutating switch toward said second reference voltage input means and varying the frequency of said variable frequency pulse generator means during a hold off time thereby producing a waveform, similar to said input signal waveform, at said output terminal of said sampler.

2. An improved sampling system according to claim 1 further comprising means for impressing said sampling pulse upon said low speed sweep circuit as a synchronizing pulse.

3. An improved sampling system according to claim 1, wherein said commutating switch is automatically commutated with given intervals.

4. An improved sampling system according to claim 2, wherein said commutating switch is automatically commutated with given intervals.

5. An improved sampling system according to claim 2, wherein said commutating switch is commutated manually.

6. An improved sampling system according to claim 1, wherein said low speed sweep circuit comprises means for producing a staircase wave.

7. An improved sampling system according to claim 6, wherein said commutating switch is automatically commutated with given intervals.

8. An improved sampling system according to claim 1, wherein said commutating switch is automatically commutated with given intervals.

9. An improved sampling system according to claim 6, wherein said commutating switch is commutated manually.

10. An improved sampling system for sampling an input waveform comprising: triggerable sampling means receptive of an input waveform for sampling voltage levels of said input waveform corresponding in time to the triggering of said sampling means and for developing an output signal proportional to said sampled voltage levels; means defining synchronizing time periods and sampling time periods; means receptive of said output signal of said sampling means for generating sampling pulses in each of said synchronizing time periods for triggering said sampling means synchronous in frequency with an integral multiple of the frequency of said input waveform and for generating sampling pulses in each of said sampling time periods for triggering said sampling means at selectively spaced time intervals from each of said synchronized sampling pulses; whereby said output signal of said sampling means reproduces said input waveform in said sampling time periods.

11. An improved sampling system according to claim 10, wherein said means defining synchronizing time periods and sampling time periods comprises a commutating circuit for developing an output pulse train having a period corresponding in time to said time periods.

12. An improved sampling system according to claim 11, wherein said means defining synchronizing time periods and sampling time periods further comprises a low frequency sweep generator for generating low frequency sweep waves having an on-time and an off-time; and wherein said communtating circuit is responsive to said low frequency sweep waves for generating an output pulse train having a period corresponding in time to said on-time and said off-time.

13. An improved sampling system according to claim 12, wherein said low frequency sweep generator comprises means for generating staircase waves responsive to each of said sampling pulses for increasing the voltage level of a voltage step in a staircase wave to the next voltage step in said staircase wave.

14. An improved sampling system according to claim 10, wherein; said means receptive of said output signal of said sampling means comprises a triggerable pulse generator for generating said sampling pulses, a low frequency sweep generator for generating low frequency sweep waves, means developing a first reference voltage, comparing means receptive of said first reference voltage and said output signal of said sampler circuit means for developing a signal proportional to the difference between said reference voltage and the voltage of said output signal of said sampler circuit means, a variable frequency pulse generator means receptive of said signal developed by said comparing means for generating an output pulse train in each of said synchronizing time periods having a frequency proportional to the voltage level of said signal developed by said comparing means and in each of said sampling time periods having a frequency equal to the last frequency in the proceeding synchronizing time period, a high frequency sawtooth generator responsive to said output pulse train of said variable frequency pulse generator means for generating high frequency sawtooth signals having a substantially greater frequency than said low frequency sweep waves, means developing a second reference voltage, commutating means receptive of said low frequency sweep waves and said second reference voltage for developing an output signal corresponding to said low frequency sweep signals in said sampling time periods and corresponding to said second reference voltage in said synchronizing time periods, and a comparator circuit receptive of said output signal of said commutating means and said high frequency sawtooth signals for comparing their voltage levels and for developing an output pulse train in each time period corresponding in time to the plurality coincidences of the voltage levels of said high frequency sawtooth signals and said output of said commutating means and for applying said output pulse train of said comparator circuit to said triggerable pulse generator for triggering same thereby generating a plurality of sampling pulses in each of said time periods, whereby said variable frequency pulse generator means varies its frequency in each of said synchronizing time periods thereby synchronizing to an integral multiple of the frequency of said input waveform and said sampler circuit means samples said input waveform in each of said sampling time periods for each of said plurality of sampling pulses thereby reproducing said input waveform by said output signal of said sampler circuit means.

* * * * *